Oct. 7, 1952  O. F. LEGG  2,612,719
ANIMAL TRAP
Filed Sept. 23, 1949

Ollie F. Legg
*INVENTOR.*

BY *Clarence A. O'Brien
and Harvey B. Jacobson*
Attorneys

Patented Oct. 7, 1952

2,612,719

UNITED STATES PATENT OFFICE 2,612,719

ANIMAL TRAP

Ollie F. Legg, Grove, Okla., assignor of one-half to Billie A. Legg, Grove, Okla.

Application September 23, 1949, Serial No. 117,402

1 Claim. (Cl. 43—79)

The present invention relates to new and useful improvements in animal traps and more particularly to means for instantly killing an animal when entering the trap to prevent suffering of the animal.

An important object of the invention is to provide a cage-type trap having an entrance opening and a trip released jaw supported at the bottom of the entrance for impaling the animal on prongs at the top of the entrance immediately upon its entrance into the trap.

A further object is to provide an animal trap of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
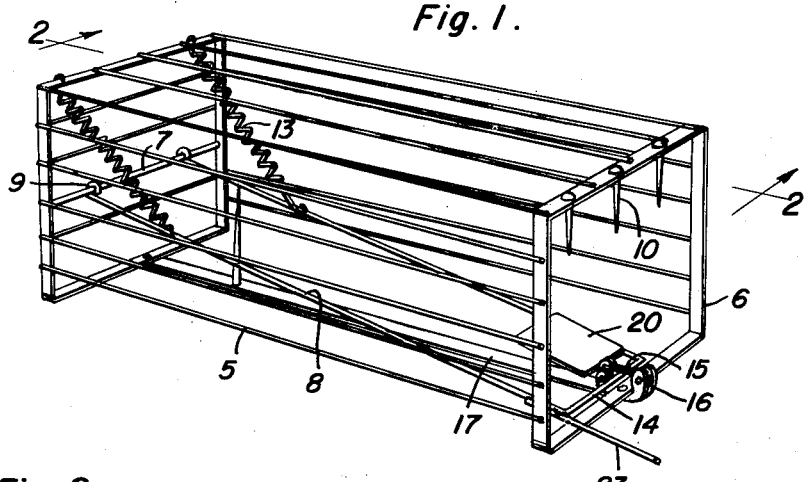
Figure 1 is a perspective view.
Figure 2:
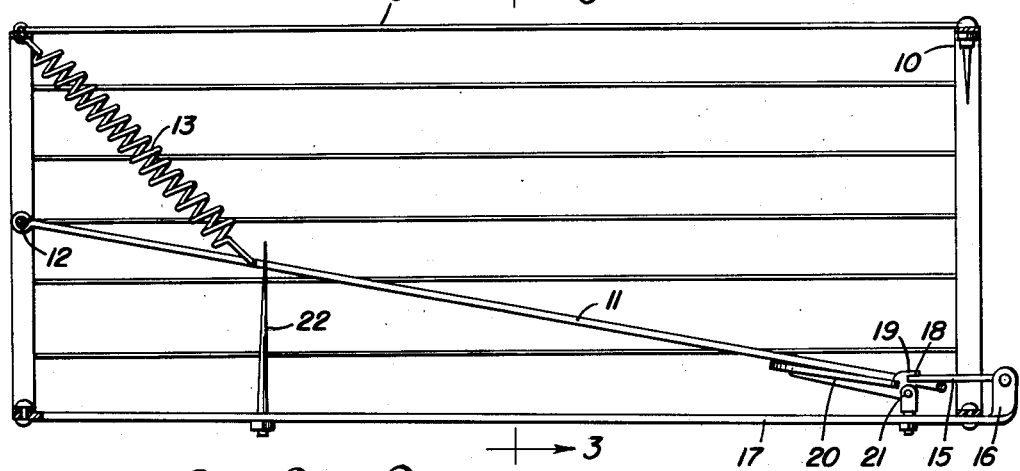
Figure 2 is an enlarged longitudinal sectional view taken on a line 2—2 of Figure 1.
Figure 3:
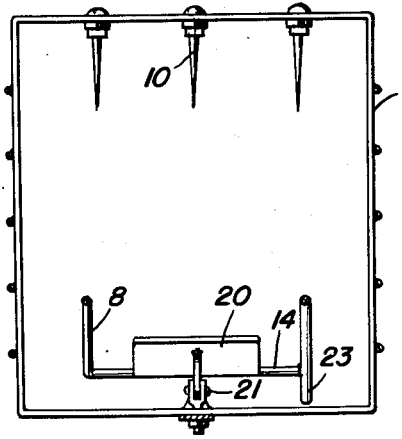
Figure 3 is a transverse sectional view taken on a line 3—3 of Figure 2.

Referring now to the drawing in detail wherein for the purpose of illustration I have disclosed a preferred embodiment of the invention the numeral 5 designates a wire cage or housing preferably of rectangular shape and having an entrance opening 6 at one end.

The other end of the cage is closed by a plurality of horizontal bars 7 and to one of the intermediate bars is pivotally attached a U-shaped wire jaw 8 by means of eyes 9 at the ends of the jaw, the jaw extending longitudinally in the cage and with its free end portion inclined toward the bottom of the cage and positioned adjacent the entrance opening 6. A plurality of spikes or prongs 10 are suitably secured to the top of the cage at its entrance above the free end of jaw 8.

A pair of coil springs 13 have their upper ends attached to one of the horizontal bars at the closed end of the trap while the lower ends of the springs are attached to the sides of the jaw 8 to pull the jaw upwardly.

The free end 14 of jaw 8 is engaged under a trigger 15 which is pivoted at one end on the upper end of an upstanding support 16 suitably secured to one of the lower bars 17 of the cage and in a position immediately forwardly of entrance 6. The free end 18 of trigger latch 15 is engaged under a lip 19 at one edge of a trip plate 20 which is pivoted as at 21 to the bottom bar 17 of the cage.

A bait attaching prong 22 is also suitably secured to bottom bar 17 of the cage adjacent the closed end thereof.

In order to facilitate setting of the trap, and particularly when constructed of a large size, a lever or handle 23 is welded or otherwise suitably secured to the free end of jaw 8 to project forwardly through the entrance 6 and by means of which the jaw may be safely held in its lowered position under trigger 15.

An animal upon entering the cage and stepping on plate 20 will tilt the plate to release trigger latch 15, whereupon springs 13 will swing jaw 8 upwardly and lift the animal and impale it on prongs 10.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

An animal trap comprising a rectangular shaped wire cage having an entrance at its front end and horizontal bars closing its rear end, a U-shaped jaw pivoted at its ends to one of the bars at the rear end of the cage and having the free end of the jaw positioned at the entrance, a spike rigidly supported in a downwardly extended position at the top of the entrance and above the jaw, a pair of coil springs connecting the sides of the jaw to the top of the cage for swinging the free end of the jaw upwardly, a longitudinal bar at the bottom of the cage and secured to the front and rear ends thereof, an animal actuated latch trigger pivoted to the front end of the bar and extending into the cage for overlying the free end of the jaw to releasably hold the jaw downwardly in its open position, a handle projecting forwardly from the free end of the jaw into a position in front of the cage for holding the jaw down while setting the trigger, and a bait holding prong rising from the bar adjacent its rear end.

OLLIE F. LEGG.

REFERENCES CITED

The following references are of record in the file of this patent:

UNITED STATES PATENTS

| Number | Name | Date |
|---|---|---|
| Re. 9,867 | Herbert | Sept. 13, 1881 |
| 139,182 | Norman | May 20, 1873 |
| 215,140 | Lynex | May 6, 1879 |
| 278,730 | Paull | June 5, 1883 |
| 1,199,901 | Keefner | Oct. 3, 1916 |
| 1,354,584 | Stevenson | Oct. 5, 1920 |
| 1,794,463 | Kelp | Mar. 3, 1931 |
| 2,160,717 | Booth | May 30, 1939 |

FOREIGN PATENTS

| Number | Country | Date |
|---|---|---|
| 179,305 | Great Britain | May 3, 1922 |